US012724316B2

(12) United States Patent
Spagnolo et al.

(10) Patent No.: US 12,724,316 B2
(45) Date of Patent: Sep. 1, 2026

(54) QUANTUM OPTICAL MEMRISTOR

(71) Applicant: UNIVERSITAET WIEN, Vienna (AT)

(72) Inventors: Michele Spagnolo, Vienna (AT); Francesco Massa, Vienna (AT); Philip Walther, Maria Enzersdorf (AT)

(73) Assignee: UNIVERSITAET WIEN, Vienna (AT)

( * ) Notice: Subject to any disclaimer, the term of this patent is extended or adjusted under 35 U.S.C. 154(b) by 313 days.

(21) Appl. No.: 18/559,327

(22) PCT Filed: May 6, 2022

(86) PCT No.: PCT/EP2022/062232
§ 371 (c)(1),
(2) Date: Nov. 6, 2023

(87) PCT Pub. No.: WO2022/234058
PCT Pub. Date: Nov. 10, 2022

(65) Prior Publication Data

US 2024/0241423 A1 Jul. 18, 2024

(30) Foreign Application Priority Data

May 7, 2021 (EP) ..................................... 21172766

(51) Int. Cl.
*H04B 10/00* (2013.01)
*G02F 1/01* (2006.01)
(Continued)

(52) U.S. Cl.
CPC ............ *G02F 1/212* (2021.01); *G02F 1/0121* (2013.01)

(58) Field of Classification Search
CPC ....... H04B 10/70; H10N 70/20; H10N 70/257
See application file for complete search history.

(56) References Cited

U.S. PATENT DOCUMENTS 5,588,032 A 12/1996 Johnson
6,002,816 A 12/1999 Penninckx
(Continued)

FOREIGN PATENT DOCUMENTS

CN 1502058 A 6/2004
CN 101071249 A 11/2007
(Continued)

OTHER PUBLICATIONS

Sanz, M., et al., "Invited Article: Quantum Memristors in Quantum Photonics", APL Photonics, American Institute of Physics, vol. 3, No. 8, Jun. 20, 2018 (Year: 2018).*
(Continued)

*Primary Examiner* — Daniel G Dobson
(74) *Attorney, Agent, or Firm* — Merchant & Gould P.C.

(57) ABSTRACT

A quantum optical memristor for manipulating photon quantum states includes a Mach-Zehnder interferometer having a first optical input and a first optical output and a second optical output. The first optical input and the first optical output of the Mach-Zehnder interferometer are a first optical input and a first optical output of the quantum optical memristor respectively. A detector is configured to detect a time-dependent optical signal at the second optical output of the Mach-Zehnder interferometer. A controller is configured to compute a target reflectivity of the Mach-Zehnder interferometer, wherein the controller is configured to update the reflectivity of the Mach-Zehnder interferometer to match the computed target reflectivity. The controller is configured to compute the target reflectivity based on the derivative of the reflectivity with respect to time. The derivative of the reflectivity with respect to time is a linear function of the detected signal.

18 Claims, 4 Drawing Sheets

(51) Int. Cl.
*G02F 1/21* (2006.01)
*H04J 14/00* (2006.01)

(56) References Cited

U.S. PATENT DOCUMENTS

| | | | | |
|---|---|---|---|---|
| 2015/0177128 | A1 | 6/2015 | Zeilinger | |
| 2019/0058117 | A1 | 2/2019 | Li | |
| 2021/0242397 | A1* | 8/2021 | Kemp | H10N 70/257 |
| 2022/0260416 | A1* | 8/2022 | Yuan | B60L 53/80 |

FOREIGN PATENT DOCUMENTS

| | | | |
|---|---|---|---|
| CN | 101350674 | A | 1/2009 |
| CN | 102210072 | A | 10/2011 |
| CN | 207689808 | U | 8/2018 |
| CN | 109792131 | A | 5/2019 |

OTHER PUBLICATIONS

International Search Report and Written Opinion received for PCT Serial No. PCT/EP2022/062232 on Sep. 8, 2022, 11 pgs.

European Extended Search Report received for EP Serial No. 21172766.4 on Nov. 11, 2021, 9 pgs.

Sanz, M., et al., "Invited Article: Quantum memristors in quantum photonics", APL Photonics, American Institute of Physics, 2 Huntington Quadrangle, Melville, NY 11747, vol. 3, No. 8, Jun. 20, 2018, XP012229409, DOI: 10.1063/1.5036596, 8 pgs.

Tasio, Gonzalez-Raya, et al., "Quantum memristors in Frequency-Entangled Optical Fields", arxiv.org, Cornell University Library, 201 Olin Library Cornell University Ithaca, NY 14853, Dec. 20, 2019, XP081563511, 8 pgs.

Pfeiffer, P., et al., "Quantum Memristors", Scientific Reports, Jul. 6, 2016, DOI: 10.1038/srep29507, URL: www.nature.com/scientificreports, 6 pgs.

Salmilehto, J., et al., "Quantum Memristors with Superconducting Circuits", arXiv: 1603.04487v2, Feb. 16, 2017, 11 pgs.

Chua, Leon O., "Memristive Devices and Systems", Proceedings of the IEEE, vol. 64, No. 2, Feb. 1976, 15 pgs.

D.V. Regelman, et al., "Optical spectroscopy of single quantum dots at runable positive, neutral, and negative charge states", Dec. 31, 2001.

M. Spagnolo, et al., "Experimental photonic quantum memristor", May 11, 2021.

Chinese Office Action received for CN Application No.: 202280041655.6 on Apr. 10, 2026, 16 pgs.

* cited by examiner

QUANTUM OPTICAL MEMRISTOR

CROSS-REFERENCE TO RELATED APPLICATION

The present application is a National Stage Filing of PCT International Application No. PCT/EP2022/062232 filed on May 6, 2022, which claims priority to European patent application No. 21172766.4, filed on May 7, 2021. Both applications are incorporated herein by reference in their entirety.

TECHNICAL FIELD

The present invention concerns a quantum optical memristor for manipulating photon quantum states comprising:

a Mach-Zehnder interferometer having at least a first optical input and having a first optical output and a second optical output, wherein the first optical input and the first optical output of the Mach-Zehnder interferometer are a first optical input and a first optical output of the quantum optical memristor, respectively; and a detector configured to detect a time-dependent optical signal n(t) at the second optical output of the Mach-Zehnder interferometer; and a controller configured to compute a target reflectivity $R_{target}$ of the Mach-Zehnder interferometer, wherein the controller is configured to update the reflectivity R(t) of the Mach-Zehnder interferometer to match the computed target reflectivity $R_{target}$.

The invention also concerns a method of manipulating optical qubits with a quantum optical memristor, wherein the quantum optical memristor comprises a Mach-Zehnder interferometer having at least a first optical input and a first optical output and a second optical output, wherein the first optical input and the first optical output of the Mach-Zehnder interferometer are a first optical input and a first optical output of the quantum optical memristor respectively; and a detector configured to detect a time-dependent optical signal n(t) at the second optical output of the Mach-Zehnder interferometer; and a controller configured to compute a target reflectivity $R_{target}$ of the Mach-Zehnder interferometer, wherein the controller is configured to update the reflectivity R(t) of the Mach-Zehnder interferometer to match the computed target reflectivity $R_{target}$; and wherein the method includes the steps of providing the quantum optical memristor with one or more photons at an optical input of the quantum optical memristor;

measuring an optical signal n(t) at the detector; and updating the reflectivity R(t) of the Mach-Zehnder interferometer to match the computed target reflectivity $R_{target}$.

Grant Information

The project leading to this application has received funding from the European Union's Horizon 2020 research and innovation programme under grant agreement No 820474, from the "Austrian Science Fund (FWF): Forschergruppe FG5", as well as from the Austrian Federal Ministry of Education, Science and Research (BMBWF) and the Austrian Federal Ministry for Digital and Economic Affairs (BMDW) via their programme "QuantERA".

PRIOR ART

The memristor was postulated as the fourth fundamental passive circuit element in addition to the resistor, capacitor, and inductor. The fundamental property of such a device is that it retains a memory of its past states in the form of a resistive hysteresis.

In Leon O Chua and Sung Mo Kang, "Memristive devices and systems", Proceedings of the IEEE 64, 209-223 (1976) the more general concept of memristive devices is introduced, which memristive devices are defined by the following coupled equations:

$$y = f(s, u, t)u,$$

$$\dot{s} = g(s, u, t),$$

where u and y denote input and output variables respectively, and s denotes a state variable, all of which are implicitly assumed to depend on time t. A device was firstly demonstrated in electronics, where u and y are current and voltage and f is a generalised resistance. A quantum memristor has to be able to go beyond the classical counterpart by enabling the same behaviour in addition to preserving quantum coherence when processing information encoded in quantum states. Dependent on the choice of input and output variables, a quantum memristor must provide the following features:

(a) Memristive behaviour in the classical limit, i.e. showing the dynamics of the above mentioned equations when the expectation values of the quantum observables are considered.

(b) Quantum coherent processing, i.e., the ability to coherently map a quantum input state onto an output state.

These two requirements are typically mutually exclusive, which poses severe technological challenges. The only circumstance for a quantum photonic device to produce the memory behaviour required in (a) is via the interaction with an environment through some form of measurement process. In practice, this is always associated with some level of decoherence, thus negating point (b) and rendering this device no different than a classical memristor. For overcoming this contradiction, it is necessary to engineer an open quantum system such that features (a) and (b) can coexist: the interaction with the environment must be strong enough for introducing an effective nonlinearity, but at the same time weak enough to sufficiently preserve quantum coherence.

A quantum memristor in electronics is shown in Salmilehto, J., Deppe, F., Di Ventra, M., Sanz, M., & Solano, E. (2017). Quantum memristors with superconducting circuits. Scientific reports, 7(1), 1-6. Salmiheto et al. introduce a quantum memristor based on quasiparticle-induced tunnelling and the cancellation of supercurrents. The memristor comprises a superconducting quantum interference device (SQUID) and a superconducting circuit. However, the electronic memristor is not suitable for photonics, i.e. for the manipulation of optical qubits. On the one hand, the SQUID and the superconducting circuit cannot process photons. On the other hand, the electronic memristor is voltage-controlled. It is essential that the voltage can take up positive as well as negative values, which is not the case for optical signals. Therefore, the algorithms shown are also not suitable for a photonic memristor.

A protocol and numerical simulations for a quantum electronic memristor based on a superconducting circuit is shown in Pfeiffer, P., Egusquiza, I. L., Di Ventra, M., Sanz, M., & Solano, E. (2016). Quantum memristors. Scientific reports, 6(1), 1-6. The proposed system consists of a quantum LC circuit shunted by a memristor. Accordingly, the components cannot be used to process photons. The protocol is based on the measurement of the voltage applied to the memristor. Again, it is essential that the voltage can take up positive as well as negative values, which is not the case for optical signals. Therefore, the protocol is not suitable for a photonic memristor.

The possibility of realising a quantum memristor in the photonic domain was pointed out in the article Mikel Sanz, Lucas Lamata, and Enrique Solano, "Invited article: Quantum memristors in quantum photonics," APL Photonics 3, 080801 (2018). Sanz et al. propose to use a Mach-Zehnder interferometer with a tunable retarder. The Mach-Zehnder interferometer acts as a tunable beam splitter, whereas its reflectivity can be changed by means of the retarder. A model for adapting the phase based on a previously detected signal is proposed. The proposed device fulfils the requirements of a memristor outlined above for coherent states and for squeezed states in theory. The model shows a deviating behaviour for Fock states which is arguably the most relevant for quantum photonics applications. In their example with Fock states they obtain a hysteresis figure that is not pinched at the origin. Physically, this happens because they use feedback functions based on the input quantity $x_{in}$, which is called quadrature operator, but an input state with zero quadrature does not always imply an output state with zero photons.

Therefore, even though their proposed device could show a memory behaviour, it is not consistent with the definition of memristive device, specifically with the required resistive hysteresis. In addition, the scheme proposed by Sanz et al. is very challenging if not impossible to implement practically, as it requires the tuning and measurement of quadrature operators, which generally entails mixing the states with a coherent beam, thus greatly complicating any experimental setup. Furthermore, the input states are given by the superposition of Fock states, which is possible but impractical to realise in linear optics, especially when considering that the average quadrature of such a state depends on its relative phase term, which would have to be tightly controlled. An additional challenge is the fact that any subsequent manipulation of a qubit encoded in a superposition with the vacuum state would be highly nontrivial. While schematically drawing a measurement that is performed at a second output of the beam splitter, Sanz et al. does not disclose how to retrieve the proposed input quantity $x_{in}$ from such a measurement.

The article "Quantum Memristors in Frequency-Entangled Optical Fields" by Gonzalez-Raya et al, 2019, discusses a different implementation of a quantum memristor in a quantum photonics setup.

SUMMARY OF THE INVENTION

It is an object of the present invention to provide a quantum optical memristor and a method capable of manipulating photon quantum states.

The invention proposes a device as defined in the outset, wherein the controller is configured to compute the target reflectivity $R_{target}$ based on the derivative of the reflectivity R(t) with respect to time, wherein the derivative of the reflectivity R(t) with respect to time is a function of the detected signal n(t), wherein said function comprises a negative term. Due to the relationship of the derivative of the reflectivity R(t) with respect to time and the signal n(t), the device acts as a memristor for quantum optical qubits, in particular also for qubits encoded as Fock states. The device is suited to become a building block for quantum information architectures, such as for example quantum neuromorphic architectures. Since the signal n(t) can only take up positive values, the negative term provides that the derivative of the reflectivity R(t) can also become negative, in other words that the reflectivity R(t) can also decrease. The negative term may be proportional to an expected maximum of the signal n(t).

Any function of the form $\dot{R}(t)=[a*n(t)]^p-b$ with a, b and p arbitrary non-zero real numbers works as long as the chosen coefficients allow the function to acquire both positive and negative values for varying values of n(t). Moreover, any function of the form $\dot{R}(t)=[a*n(t)-b]^p$ where p is an odd integer works.

Generally, within the scope of the present disclosure, the derivative of the reflectivity $\dot{R}(t)$ with respect to time may be any function of the detected signal n(t).

Optionally, the derivative of the reflectivity $\dot{R}(t)$ with respect to time may be a linear function of the detected signal n(t). The negative term may optionally be a negative offset proportional to an expected maximum of the signal n(t). For example, the derivative of the reflectivity $\dot{R}(t)$ may have the form $\dot{R}(t)=n(t)-0.5*\max(n(t))$.

The invention also concerns a method as defined in the outset, wherein the controller is configured to compute the target reflectivity $R_{target}$ based on the derivative of the reflectivity $\dot{R}(t)$ with respect to time, wherein the derivative of the reflectivity $\dot{R}(t)$ with respect to time is a function of the signal n(t), wherein said function comprises a negative term, and wherein the target reflectivity $R_{target}$ is calculated based on the derivative of the reflectivity $\dot{R}(t)$ with respect to time. Due to the relationship of the derivative of the reflectivity $\dot{R}(t)$ with respect to time and the signal n(t), the method is suitable for manipulating quantum optical qubits, in particular also qubits encoded as Fock states.

As a Mach-Zehnder interferometer we understand any device that is capable of adjusting the probability $P_1$ with which a photon arriving at an input is emitted at a first of two or more (M) outputs. Where $$P_1 = 1 - \sum_{i=2}^{M} P_i$$

and $P_i$ is the probability that the photon is emitted at output i of the total M outputs.

The Mach-Zehnder interferometer can act as a beamsplitter and the probabilities can be changed by changing the relative phase of the light paths. In this embodiment, the interferometer can act as a tunable beam splitter, which is why $P_1$ can be also referred to as the "reflectivity" of the Mach-Zehnder interferometer.

In a typical embodiment, the Mach-Zehnder interferometer may be a device that splits the incoming light on two paths using a first beam splitter, introduces a relative phase term between the two paths, for example by means of a retarder, and recombines the two paths at a second beam splitter. The probability $P_1$ with which an incoming photon is emitted at the first of the two outputs of the Mach-Zehnder can be changed by changing the relative phase term of the two paths. In this embodiment, the overall action of the Mach-Zehnder interferometer is thus equivalent to that of a tunable beam splitter.

In another preferred embodiment, the controller is configured to perform an integration step over the derivative of the reflectivity $\dot{R}(t)$, preferably a time-window integration step over a time frame of length T, to obtain the target reflectivity $R_{target}$. The time window integration step is used to estimate the target reflectivity $R_{target}$ based on the derivative of the reflectivity R(t), respectively based on the signal n(t). Preferably $R_{target}$ is estimated using the following formula:

$$R_{target} = 0.5 + \frac{1}{T}\int_{t-T}^{t}(n(\tau) - 0.5)d\tau.$$

This way, the device neglects the signal n(t) for t is less than t-T. In other words, only the signal in the time frame t-T up to t is relevant for the calculation of $R_{target}$. From a physical point of view this is necessary and justified because no real device can keep memory over an infinitely long time. The constant terms 0.5 and −0.5 can be cancelled out in the formula for $R_{target}$ stated above. However, even though the signal n(t) never assumes a negative value, since the signal n(t) can increase and decrease and due to the limited "window size" T of the time window integration, $R_{target}$ can also increase and decrease.

It is noteworthy that when the lower boundary of the integration interval is a (positive) function of time, this results in the derivative comprising a negative term. For example, for $$R_{target} = \frac{1}{T}\int_{t-T}^{t} n(\tau)d\tau$$

the derivative of the reflectivity is $$\dot{R}(t) = \frac{n(t)}{T} - \frac{n(t-T)}{T},$$

the second term on the right-hand side being a negative term. In other words, when defining the target reflectivity $R_{target}$ as an integral, the derivative of the reflectivity R(t) with respect to time can be a function comprising a negative term within the scope of the present disclosure even when there is no negative term in the integrand of said integral.

Optionally the length T of the time frame is configurable and is preferably configured to be equal to or lower than a modulation period of an optical input signal at an optical input of the Mach-Zehnder interferometer. Depending on the relation between the modulation period of the optical input signal and the integration time T, two limiting regimes can be accessed. When the integration time T is small compared to the modulation period, the input can be considered approximately constant. The behavior then reduces to R(t) =n(t) for the single photon case. In contrast, when the input oscillates very quickly such that the modulation time is small compared to the integration time T, the integral tends to zero, so that R(t)=0.5, leading to a constant reflectivity R of 50%. When the integration time equals the modulation period, the integral is over a full period of the modulation and therefore zero. Hence, integrating over more than one period yields redundant results. For this reason, the integration time is preferably equal to or smaller than the modulation period.

For example, the signal n(t) at the detector can relate to a detected number of photons (e.g., a photon count). Especially for applications where a low number of photons is involved, in particular when the device is used to manipulate qubits encoded as single photons, this is especially advantageous. The detector can be a single-photon detector (e.g., a photon counter).

In a preferred embodiment the quantum optical memristor comprises a parallel path having an optical input and an optical output, wherein the optical input and the optical output of the parallel path are a second optical input and a second optical output of the quantum optical memristor respectively, wherein the parallel path and the Mach-Zehnder interferometer are configured to be supplied by the same source of photons, wherein the parallel path essentially does not manipulate the state of the photons in the parallel path. The parallel path provides the possibility for the quantum optical memristor to transmit photons without having them interact with the Mach-Zehnder interferometer. Photons can therefore be either manipulated or can be transmitted essentially in their original state.

Preferably, the parallel path is configured to relate to a first spatial mode and the Mach-Zehnder interferometer is configured to relate to a second spatial mode of a qubit encoded as a single photon in a superposition of the first and the second spatial mode. This way, qubits can be path-encoded rather than being encoded in a superposition of energy states. Path encoded qubits are easier to handle in quantum optics compared to qubits encoded as a superposition of two energy levels. This embodiment drastically broadens the possibilities of application.

Preferably the quantum optical memristor comprises a parallel path having an optical input and an optical output, wherein the optical input and the optical output of the parallel path are a second optical input and a second optical output of the quantum optical memristor respectively, wherein the first optical input and the second optical input of the quantum optical memristor are configured to be supplied by the same source of photons, wherein the parallel path essentially does not manipulate the state of the photons in the parallel path, wherein the parallel path is configured to relate to a first spatial mode and the Mach-Zehnder interferometer is configured to relate to a second spatial mode of a qubit encoded as a single photon in a superposition of the first and the second spatial mode; wherein the method includes: providing the quantum optical memristor with a qubit encoded as a photon in a superposition of the first and the second spatial mode. The method is suitable for qubits encoded as a superposition of two spatial modes, which is an especially beneficial and natural choice for integrated quantum photonics.

Optionally the Mach-Zehnder interferometer comprises two beam splitters, wherein the beam splitters have a 50/50 splitting ratio. In order to have maximum tunability of the reflectivity over the full range between 0 and 1, the beam splitters should have a 50/50 splitting ratio.

Preferably the quantum optical memristor is partly provided as a part of an integrated photonic chip, wherein at least the Mach-Zehnder interferometer is part of the integrated photonic chip. The Mach-Zehnder interferometer includes two beam splitters and a retarder, which can also be part of the integrated photonic chip. The retarder is part of one of the two arms of the Mach-Zehnder interferometer and is used to change the relative phase between the two arms. Being part of an integrated photonic chip, the components of the quantum optical memristor can be manufactured in a reliable and reproduceable fashion and the cost per piece can be reduced. In addition, the optical paths are rigidly mechanically connected, therefore preventing phase decoherence. At least the detector and the controller are typically external components.

Optionally, the quantum optical memristor is partly provided as a part of an integrated photonic chip, wherein at least the Mach-Zehnder interferometer and the parallel path are part of the integrated photonic chip. Being part of an integrated photonic chip, the components of the quantum optical memristor can be manufactured in a reliable and reproduceable fashion and the cost per piece can be reduced. In addition, the optical paths are rigidly mechanically connected, therefore preventing phase decoherence. At least the detector and the controller are typically external components.

In a preferred embodiment the quantum optical memristor is at least partly based on glass and is laser-written in the glass, wherein at least the Mach-Zehnder interferometer is based on glass and laser-written in the glass. Glass is especially well suited as a substrate and is suitable for laser-writing, which offers a high level of reproducibility.

In another preferred embodiment the quantum optical memristor is at least partly based on glass and is laser-written in the glass, wherein at least the Mach-Zehnder interferometer and the parallel path are based on glass and laser-written in the glass. Glass is especially well suited as a substrate and is suitable for laser-writing, which offers a high level of reproducibility.

Preferably the Mach-Zehnder interferometer comprises two beam splitters, wherein the beam splitters are guided directional couplers. Guided directional couplers are ready and reliable components in integrated photonics and are suited to serve as beam splitters for this application.

In the following, preferred embodiments of the quantum optical memristor and the method of manipulating optical qubits with a quantum optical memristor according to the invention will be defined, as well as preferred combinations thereof.

1. Quantum Optical Memristor for Manipulating Photon Quantum States Comprising:
   a Mach-Zehnder interferometer having at least a first optical input and having a first optical output and a second optical output, wherein the first optical input and the first optical output of the Mach-Zehnder interferometer are a first optical input and a first optical output of the quantum optical memristor respectively; and
   a detector configured to detect a time-dependent optical signal n(t) at the second optical output of the Mach-Zehnder interferometer; and
   a controller configured to compute a target reflectivity $R_{target}$ of the Mach-Zehnder interferometer, wherein the controller is configured to update the reflectivity R(t) of the Mach-Zehnder interferometer to match the computed target reflectivity $R_{target}$,
   characterized in that the controller is configured to compute the target reflectivity $R_{target}$ based on the derivative of the reflectivity l(t) with respect to time, wherein the derivative of the reflectivity l(t) with respect to time is a linear function of the detected signal n(t).
2. Quantum optical memristor according to embodiment 1, characterized in the linear function has a negative offset proportional to an expected maximum of the signal n(t).
3. Quantum optical memristor according to embodiment 1 or 2, characterized in that the controller is configured to perform an integration step over the derivative of the reflectivity R(t), preferably a time-window integration step over a time frame of length T, to obtain the target reflectivity $R_{target}$.
4. Quantum optical memristor according to embodiment 3, characterized in that the length T of the time frame is configurable and is preferably configured to be equal to or lower than a modulation period of an optical input signal at an optical input of the Mach-Zehnder interferometer.
5. Quantum optical memristor according to any one of embodiments 1 to 4, characterized in that the signal n(t) at the detector relates to a detected number of photons.
6. Quantum optical memristor according to any one of embodiments 1 to 5, characterized in that a parallel path having an optical input and an optical output is provided, wherein the optical input and the optical output of the parallel path are a second optical input and a second optical output of the quantum optical memristor respectively, wherein the parallel path and the Mach-Zehnder interferometer are configured to be supplied by the same source of photons, wherein the parallel path essentially does not manipulate the state of the photons in the parallel path.
7. Quantum optical memristor according to embodiment 6, characterized in that the parallel path is configured to relate to a first spatial mode and the Mach-Zehnder interferometer is configured to relate to a second spatial mode of a qubit encoded as a single photon in a superposition of the first and the second spatial mode.
8. Quantum optical memristor according to any one of embodiments 1 to 7, characterized in that the Mach-Zehnder interferometer comprises two beam splitters (14, 15), wherein the beam splitters (14, 15) each have a 50/50 splitting ratio.
9. Quantum optical memristor according to any one of embodiments 1 to 8, characterized in that the quantum optical memristor is at least partly provided as a part of an integrated photonic chip, wherein at least the Mach-Zehnder interferometer is part of the integrated photonic chip.
10. Quantum optical memristor according to embodiment 6 or 7, characterized in that the quantum optical memristor is at least partly provided as a part of an integrated photonic chip, wherein at least the Mach-Zehnder interferometer and the parallel path are part of the integrated photonic chip.
11. Quantum optical memristor according to embodiment 9 or 10, characterized in that the quantum optical memristor is at least partly based on glass and is laser-written in the glass wherein at least the Mach-Zehnder interferometer is based on glass and laser-written in the glass.
12. Quantum optical memristor according to embodiment 10, characterized in that the quantum optical memristor is at least partly based on glass and is laser-written in the glass wherein at least the Mach-Zehnder interferometer and the parallel path are based on glass and laser-written in the glass.
13. Quantum optical memristor according to any one of embodiments 1 to 12, characterized in that the Mach-Zehnder interferometer comprises two beam splitters (14, 15), wherein the beam splitters (14, 15) are guided directional couplers (17, 18).
14. Method of manipulating optical qubits with a quantum optical memristor, wherein the quantum optical memristor comprises:
    a Mach-Zehnder interferometer having at least a first optical input and a first optical output and a second optical output, wherein the first optical input and the first optical output of the Mach-Zehnder interferometer are a first optical input and a first optical output of the quantum optical memristor respectively; and a detector configured to detect a time-dependent optical signal n(t) at the second optical output of the Mach-Zehnder interferometer; and a controller configured to compute a target reflectivity Rmget of the Mach-Zehnder interferometer, wherein the controller is configured to update the reflectivity R(t) of the Mach-Zehnder interferometer to match the computed target reflectivity $R_{target}$, characterized in that the controller is configured to compute the target reflectivity $R_{target}$ based on the derivative of the reflectivity R(t) with respect to time, wherein the derivative of the reflectivity R(t) with respect to time is a linear function of the signal n(t);

the method including the steps of:

providing the quantum optical memristor with one or more photons at the first optical input of the quantum optical memristor;

measuring an optical signal n(t) at the detector; and updating the reflectivity R(t) of the Mach-Zehnder interferometer to match the computed target reflectivity $R_{target}$;

characterized in that the target reflectivity $R_{target}$ is calculated based on the derivative of the reflectivity R(t) with respect to time, wherein the reflectivity R(t) is a linear function of the detected signal n(t).

15. The method of embodiment 14, characterized in that the quantum optical memristor comprises a parallel path having an optical input and an optical output, wherein the optical input and the optical output of the parallel path are a second optical input and a second optical output of the quantum optical memristor respectively, wherein the first optical input and the second optical input of the quantum optical memristor are configured to be supplied by the same source of photons, wherein the parallel path essentially does not manipulate the state of the photons in the parallel path, wherein the parallel path is configured to relate to a first spatial mode and the Mach-Zehnder interferometer is configured to relate to a second spatial mode of a qubit encoded as a single photon in a superposition of the first and the second spatial mode; wherein the method includes:

providing the quantum optical memristor with a qubit encoded as a photon in a superposition of the first and the second spatial mode.

BRIEF DESCRIPTION OF THE FIGURES

The invention is further explained below with reference to particularly preferred examples of embodiments and with reference to the drawings. However, the invention is not intended to be limited to these embodiments.

DETAILED DESCRIPTION OF THE INVENTION

Figure 1:
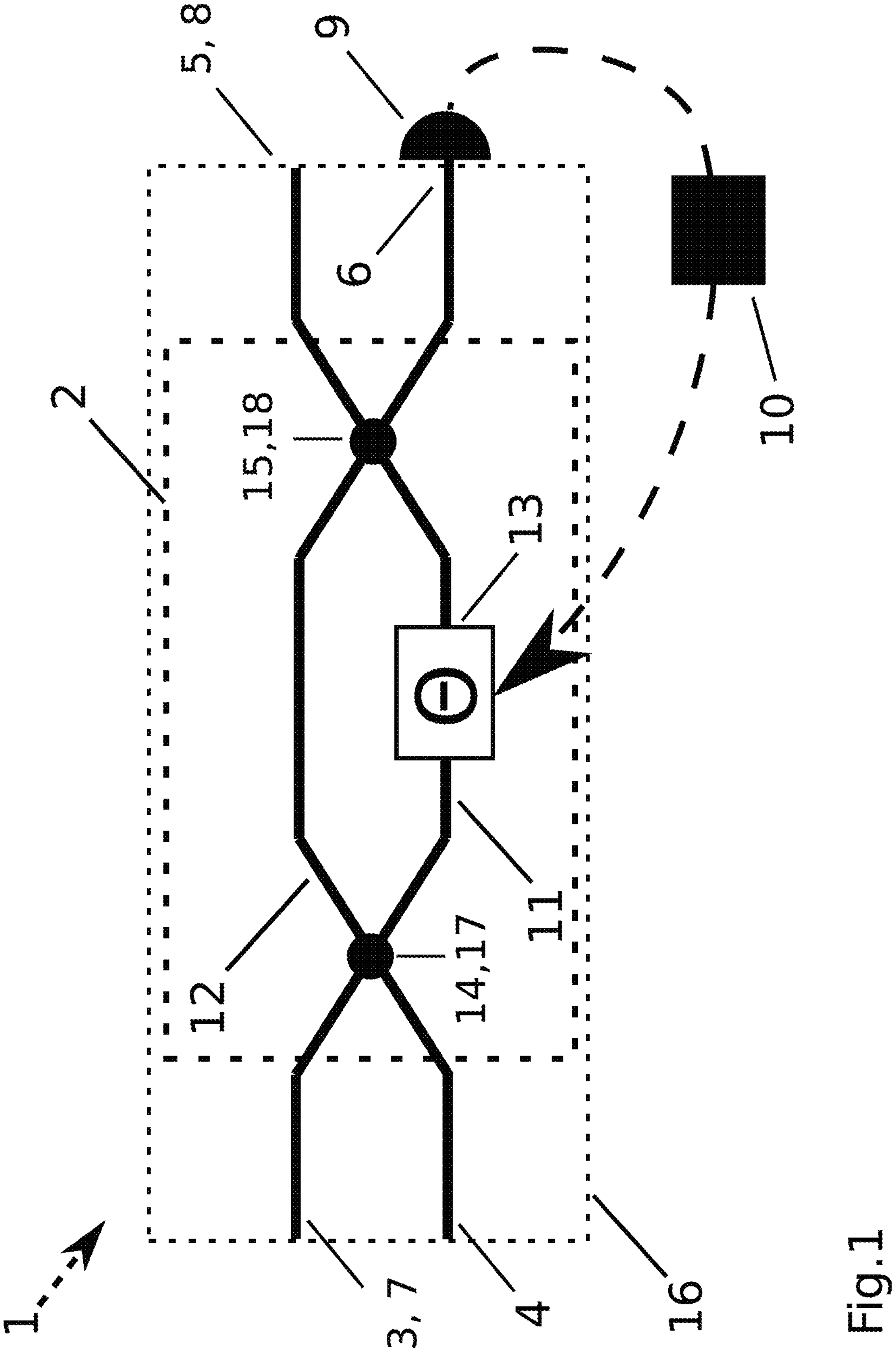
FIG. 1 schematically shows a quantum optical memristor in a first embodiment.

FIG. 1 shows the quantum optical memristor 1 for manipulating photon quantum states in a first embodiment. The quantum optical memristor 1 comprises a Mach-Zehnder interferometer 2 having at a first optical input 3 and a second optical input 4 and having a first optical output 5 and a second optical output 6. The first optical input 3 and the first optical output 5 of the Mach-Zehnder interferometer are a first optical input 7 and a first optical output 8 of the quantum optical memristor 1 respectively. A detector 9 is configured to detect a time-dependent optical signal n(t) at the second optical output 6 of the Mach-Zehnder interferometer 2.

Furthermore, a controller 10 configured to compute a target reflectivity $R_{target}$ of the Mach-Zehnder interferometer 2, wherein the controller 10 is configured to update the reflectivity R(t) of the Mach-Zehnder interferometer 2 to match the computed target reflectivity $R_{target}$. The reflectivity of the Mach-Zehnder interferometer is the probability of a photon to change paths 11, 12 in the Mach-Zehnder interferometer 2. The controller 10 therefore controls the phase difference of the paths 11, 12, thereby controlling the reflectivity R(t). In one of the paths 11, 12 means to change the phase 13 are included, for example a phase retarder, which is controlled by the controller 10. The controller 11 is configured to compute the target reflectivity $R_{target}$ based on the derivative of the reflectivity $\dot{R}(t)$ with respect to time, wherein the derivative of the reflectivity $\dot{R}(t)$ with respect to time is a function of the detected signal n(t). The function is a linear function and has a negative offset proportional to an expected maximum of the signal n(t). Typically, the maximum of the signal n(t) is 1 or the signal is normalized to 1. In principle, the photons arrive at distinctive times and cause a sharp signal at the detector. Typically, the detector also includes a filter, such us a low-pass filter, for example a RC filter. The filter smoothes the signal. Single photons therefore do not cause a single sharp spike in the signal, but rather a signal, which is broad with respect to time.

The derivative of the reflectivity $\dot{R}(t)$ with respect to time in this exemplary embodiment has the form: $\dot{R}(t)=n(t)-0.5*\max(n(t))$. The offset guarantees that the derivative of the reflectivity R(t) with respect to time can become negative, although the signal n(t) is restricted to zero and positive values. In more detail, the detector directly measures a signal $n_{meas}(t)$ which is used to estimate the signal n(t) by taking into account the reflectivity R(t) at the respective time. The signal n(t) is estimated by the following formula: $n(t)=n_{meas}(t)/R(t)$. Whereas the reflectivity R(t) at the time of measurement is known since the controller 1) is in control of the reflectivity R(t). In order to estimate $R_{target}$ based on the signal n(t) the the controller 10 is configured to perform an integration step over the derivative of the reflectivity $\dot{R}(t)$, namely a time-window integration step over a time frame of length T according to the following equation:

$$R_{target} = 0.5 + \frac{1}{T}\int_{t-T}^{t} (n(\tau) - 0.5)d\tau.$$

A control is implemented in order to prevent the reflectivity R(t) to go to exactly zero, otherwise the feedback could break. This is also reasonable since the reflectivity of a device can never reach exactly zero. The estimation only takes into account the signal n(t) within a time frame t-T up to t. This is necessary since a real device cannot measure or store an indefinite signal.

The behavior of the quantum optical memristor can be tuned by the choice of the length T of the time frame, which is configurable. The length T is preferably chosen to be equal to or lower than a modulation or oscillation period $T_{osc}$ of an optical input signal at the optical input 7 of the Mach-Zehnder interferometer 2. If a low-pass filter, for example a RC filter, is used, the integration time T must be greater than the time constant of the filter. Depending on the relation between the modulation period of the optical input signal, and the length T, two limiting regimes can be accessed. When the integration time T is small compared to the modulation period, the input can be considered (approximately) constant. The behavior reduces to R(t)=n(t). In contrast, when the input oscillates very quickly such that the modulation time is small compared to the integration time T, the integral tends to zero, so that R(t)=0.5, leading to a constant reflectivity R of 50%. When the integration time equals the modulation period, the integral extends over a full period of the modulation and therefore zero. Hence, integrating over more than one period yields redundant results. For this reason, the integration time is preferably equal to or smaller than the modulation period.

The signal n(t) at the detector 9 relates to a detected number of photons. In this case, the detector is a single-photon detector. The Mach-Zehnder interferometer comprises two beam splitters 14, 15, which each have a 50/50 splitting ratio. This splitting ratio is especially beneficial for controlling the reflectivity R(t).

The quantum optical memristor 1 is partly provided as a part of an integrated photonic chip 16. Namely the Mach-Zehnder interferometer 2 including the beam splitters 14, 15 and means to change the phase 13, such as a retarder, are part of the integrated photonic chip. The detector 9 and the controller 10 are external parts. By using advanced processes and technologies known in the field of integrated photonics, the quantum optical memristor 1 can be manufactured in a reliable, stable and reproducible manner. These processes are in addition relatively easy to scale, leading to a low cost per unit. Also, the quantum optical memristor 1 can be realized having small dimensions and being intrinsically compatible with further integrated photonics components. In addition, the relevant components of the quantum optical memristor 1 are mechanically connected to each other via the integrated photonic chip 16 in a rigid manner. This prevents an undesirable level of phase decoherence of qubits, which could adversely influence the properties of the quantum optical memristor 1. In this context, thermal phase shifters can be used as means to change the phase 13. For example, the quantum optical memristor 1 can be based on glass and is laser-written in the glass. The beam splitters 14, 15 are guided directional couplers 17, 18. Guided directional couplers 17,18 are ready and reliable components in integrated photonics and are suited to serve as beam splitters 14, 15 for this application.

The quantum optical memristor 1 can be used to manipulate photon quantum states by providing the quantum optical memristor 1 with one or more photons at an optical input 7 of the quantum optical memristor 1, measuring an optical signal n(t) at the detector 9 and updating the reflectivity R(t) of the Mach-Zehnder interferometer 2 to match the computed target reflectivity $R_{target}$.

The fabrication of the integrated photonic chip can be based on a femtosecond laser micromachining process. Single-mode optical waveguides, optimised for operation at 1550 nm, are inscribed in an alumino-borosilicate glass (Corning EAGLE XG, 1.1 mm thick) by focusing laser pulses (Yb:KYW cavity-dumped mode-locked laser: 1030 nm wavelength, 300 fs pulse duration, 520 nJ energy per pulse, 1 MHz repetition rate) with a 50× objective (0.65 NA) equipped with an aberration-correction collar. The entire optical circuit is inscribed at 25 μm from the bottom surface of the substrate, by translating the substrate at the constant speed of 40 mm/s. In particular, six overlapped laser scans are performed along the desired waveguide path. In order to obtain single-mode operation and reduce the waveguide birefringence, the inscription process is followed by a thermal annealing composed of a fast rising ramp of 12° C./min up to 750° C. and by two subsequent slow falling ramps of 12° C./h and 24° C./h, respectively down to 630° C. and 500° C. After that, the cooling process is completed with no control on the temperature ramps. At the end of the waveguide fabrication process, the measured insertion loss is 1.2 dB, corresponding to a transmission of 76%.

The Mach-Zehnder interferometer 2 is composed of two balanced directional couplers 17, 18 (zero interaction length and 7.5 μm coupling distance), that can be connected to the rest of the circuit by S-bend waveguides (40 mm curvature radius) and by straight waveguides (separation p=127 μm and length L=2 mm). In order to guarantee maximum efficiency and minimal crosstalk of the phase shifting operation, thermal insulating trenches are ablated at both sides of the optical waveguides that are supposed to be phase-tuned. To fabricate the trenches laser pulses are used (Light Conversion PHAROS: 1030 nm wavelength, 1 μs pulse duration, 1.5 μJ energy per pulse, 20 kHz repetition rate) focused by a 20× water-immersion objective (0.50 NA) on the bottom surface of the substrate, while the latter is translated at 4 mm/s entirely immersed in distilled water. This fabrication technique is usually referred to as water-assisted laser ablation. In order to realise a single trench with depth $D_t$=300 μm, width $W_t$=97 μm and length $L_t$=L=2 mm, four rectangular glass blocks (depth $D_b$=$D_t$/4=75 μm) are removed one after the other by ablating only the perimeter of each block and making it detach and fall into the water. In this way, deep trenches are fabricated on the bottom side of the substrate with near-unity yield. After that, the substrate is flipped and the process continues on the bottom side with the fabrication of the thermal phase shifters. Firstly, after a standard piranha cleaning bath, a metal multilayer film, composed of 3 nm of chromium and 100 nm of gold, is deposited on the entire area of the chip by using a magnetron sputtering system. Secondly, a further thermal annealing (rising ramp of 10° C./min up to 500° C., followed by 60 min at this temperature and by a cooling process with no thermal actuation) is employed to reach a stable value of the electrical resistivity and to prevent electrical drifts that would impair the stability of the phase shifting operation. Lastly, the thermal phase shifters are patterned by laser pulses (Yb:KYW cavity-dumped mode-locked laser: 1030 nm wavelength, 300 fs pulse duration, 200 nJ energy per 669 pulse, 1 MHz repetition rate) focused on the chip surface with a 10× objective (0.25 NA). By translating the substrate at 2 mm/s, contact pads and electrodes are isolated by selectively removing the metal. Resistive microheaters having width $W_r$=p−$W_t$=30 μm and length $L_r$=L=2 mm are instead isolated by the presence of the trenches. The average electrical resistance of the microheaters is 38Ω, while the resulting electrical power needed to induce a 2π phase shift is as low as 55 mW. In the end, the photonic chip is mounted on an aluminium heat sink, wire-bonded to a printed circuit board and pigtailed to both input and output single-mode optical fibers. After the pigtailing process, the total insertion loss from input to output fibers is 2 dB, corresponding to a transmission of 63%.

Figure 2:
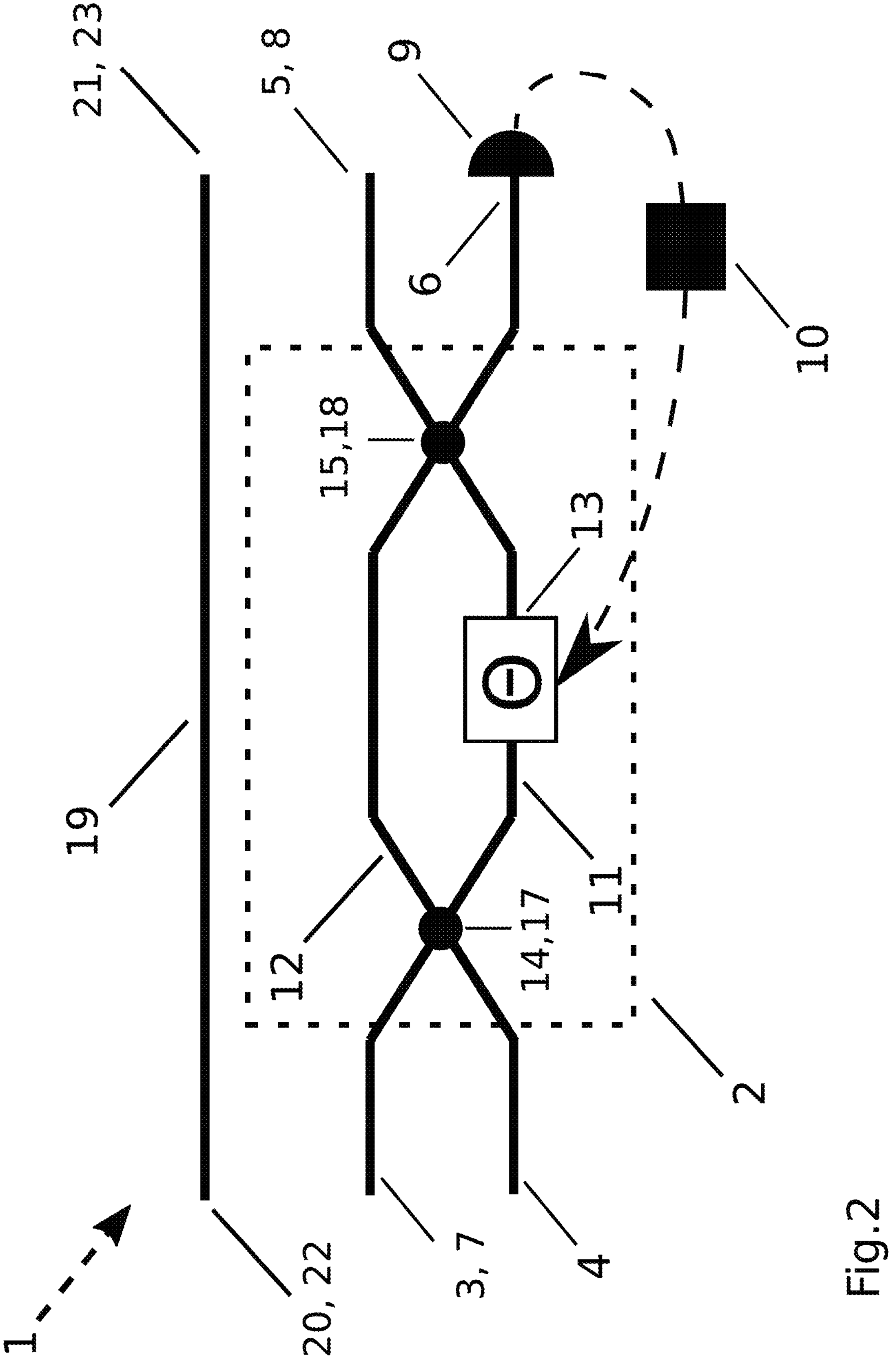
FIG. 2 schematically shows a quantum optical memristor in a second embodiment comprising a parallel path.

FIG. 2 shows another embodiment of the quantum optical memristor 1. In addition to the embodiment shown in FIG. 1, the quantum optical memristor comprises a parallel path 19 having an optical input 20 and an optical output 21. The optical input 20 and the optical output 21 of the parallel path 19 are a second optical input 22 and a second optical output 2) of the quantum optical memristor 1 respectively. The parallel path 19 and the Mach-Zehnder interferometer 2 are configured to be supplied by the same source of photons, in other words the quantum optical memristor 1 is supplied by one source of photons. The parallel path 1) essentially does not manipulate the state of the photons in the parallel path 19. No additional components are part of the parallel path 19 which could alter the state of the photons. The parallel path 19 is configured to relate to a first spatial mode and the Mach-Zehnder interferometer 2 is configured to relate to a second spatial mode of a qubit encoded as a single photon in a superposition of the first and the second spatial mode. The quantum optical memristor 1 is therefore suited to manipulate qubits that are path-encoded rather than being encoded in a superposition of energy states. Path encoded qubits are easier to handle in quantum optics compared to qubits encoded as a superposition of two energy levels. In addition to the Mach-Zehnder interferometer 2, also the parallel path 19 can be realized as a part of an integrated photonic chip 16 (not shown).

Figure 3:
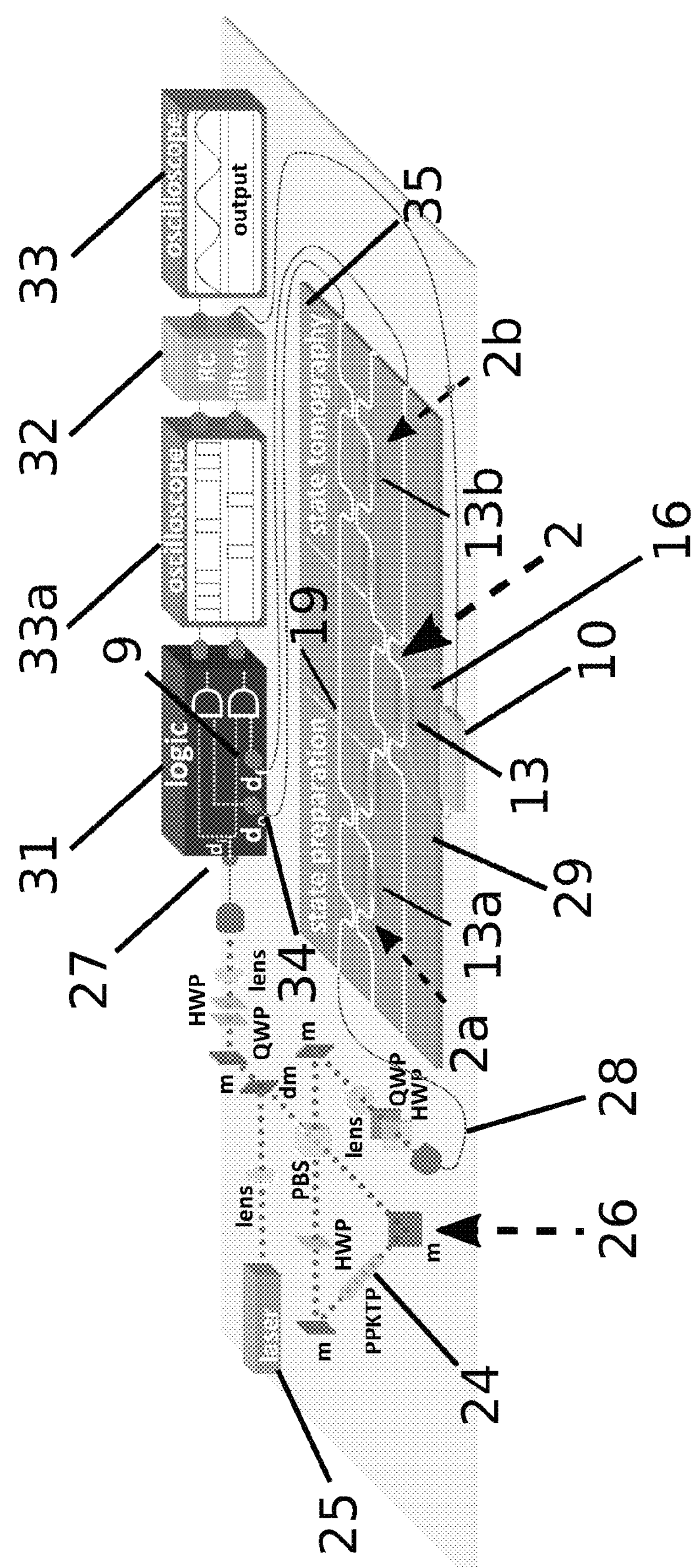
FIG. 3 schematically shows an experimental setup to manipulate single photons with a quantum optical memristor according to FIG. 2.

FIG. 3 shows an experimental setup to manipulate single photons including and using the quantum optical memristor 1 according to FIG. 2. A collinear Type II SPDC source emits pairs of identical photons at 1550 nm. The source is based on a 30 mm PPKTP crystal 24 with a poling period of 46.2 μm adapted for downconversion from 775 to 1550 nm. The crystal is pumped by a CW amplified diode laser 25 (Toptica TA Pro 780) with a pump power of approximately 80 mW. The crystal is inserted in a Sagnac interferometer 26 which produces polarization-entagled photons, although in this specific case the entanglement is not used.

The optical components used for the generation of the photons are labeled as follows:

| | |
|---|---|
| m | Mirror |
| dm | Dicroic mirror |
| QWP | Quarter wave plate |
| HWP | Half wave plate |
| PBS | Polarizing beam splitter |
| PPKTB | PPKTB crystal 24 |
| logic | logic unit |

One of the photons, referred to as idler, is sent directly to the detector 27 for heralding, while the other photon, referred to as the signal, is coupled to the integrated photonic chip 16 via a single-mode fiber 28 which is directly glued to the surface of the photonic chip 16. In the photonic chip 16, the signal photon goes through the state preparation stage 29, which includes a Mach-Zehnder interferometer 2*a* with a retarder 13*a*, and then through the quantum optical memristor 1, which also includes a parallel path 19 so that dual rail or path encoded qubits can be manipulated. Consequently, there is a state tomography stage 35, including a Mach-Zehnder interferometer 2*b* and a retarder 13*b*. The state tomography stage 35 is used to show that the device preserves some of the initial quantum coherence. The controller 10 is pigtailed to single-mode fibers 30 attached to the detectors. We use superconducting nanowire single-photon detectors 9, 27, 34, (PhotonSpot Inc.) with average detection efficiency above 95%. We use three detectors 27, 9, 34: one for the heralding (idler) photon 27, one for the signal n(t) 9, and one for the output signal 34 of the quantum optical memristor 1.

After the detectors 9, 27, 34 a logic unit 31 analyses the signals. Every idler and signal n(t) coincidence triggers the generation of a square voltage pulse in the signal channel. The resulting signals are schematically shown on an oscilloscope 33*a* (lower pulse train). Equally, every idler and output coincidence triggers a voltage pulse in the output channel (upper pulse train of the oscilloscope 33*a*). With a pump power of about 80 mW in the source, the maximum coincidence rate in each channel is approximately $3\times10^4$ counts/s. Both channels are then low-pass filtered with RC=100 ms filters 32. This has the effect of averaging the trains of pulses and providing a continuous voltage signal that is proportional to the pulse rate, which is in turn proportional to the photon number. Measuring the output voltage of the RC filters 32 constitutes therefore a measurement of the photon number. Note that the time constant RC should be much smaller than the integration time T. Here, T=10 s is used.

At this point, the output signal goes to an oscilloscope 33*b* for final data logging, while the feedback signal goes to a controller 10 which computes n(t) and $R_{target}$ and updates the value of the reflectivity R(t) of the quantum optical memristor 1. The controller 10 changes the value of the reflectivity R(t) by changing the voltage applied to the thermal phase shifter of the Mach-Zehnder interferometer 2. The phase shifter produces a phase shift proportional to the dissipated electrical power.

Figure 4:
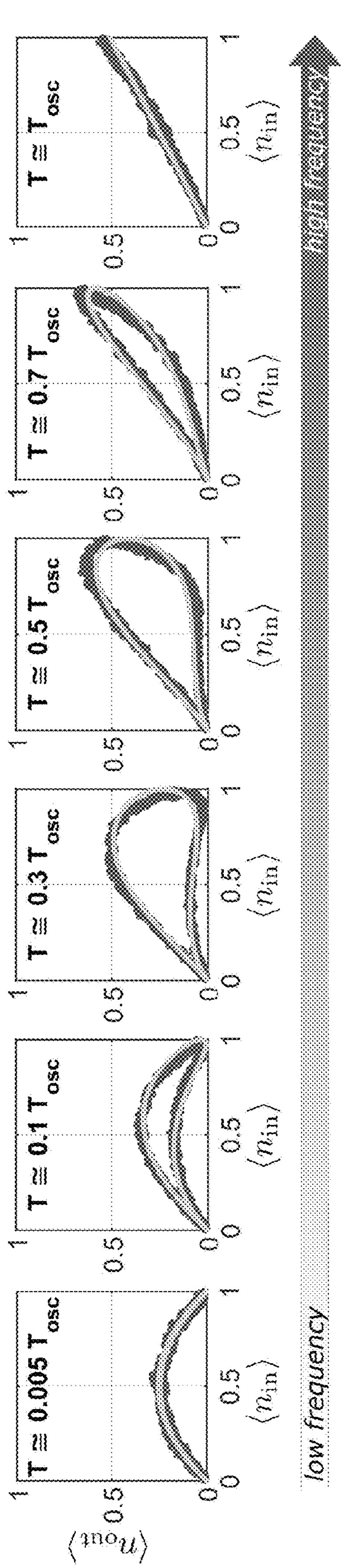
FIG. 4 shows experimental results obtained with the experimental setup of FIG. 3.

FIG. 4 shows experimental results (dots) obtained with the experimental setup shown in FIG. 3 and simulations (lines). $n_{in}$ is the signal at the input, whereas $n_{out}$ is the output signal. The oscillation period $T_{osc}$ is kept constant at 10 s and the integration time T is varied on the range of one oscillation period $T_{osc}$. The device shows a hysteresis figure pinched at the origin which reduces to a linear relation at high frequencies, and a nonlinear one at low frequencies. Since the high frequency limit is, in this case, the same as $T=T_{osc}$, the experimental results provide a full characterization of the dynamic response of the device. The experimental data is in good agreement with the simulated dynamics. Specifically, the low frequency limit $n_{out}=n_{in}-n_{in}^2$ and the high frequency limit $n_{out}=0.5*n_{in}$ are as expected. This is also in agreement with the original definition of a memristive device.

The invention claimed is:

1. A quantum optical memristor for manipulating photon quantum states comprising:
   - a Mach-Zehnder interferometer having at least a first optical input and having a first optical output and a second optical output, wherein the first optical input and the first optical output of the Mach-Zehnder interferometer are a first optical input and a first optical output of the quantum optical memristor respectively; and
   - a detector configured to detect a time-dependent optical signal at the second optical output of the Mach-Zehnder interferometer; and
   - a controller configured to compute a target reflectivity of the Mach-Zehnder interferometer, wherein the controller is configured to update the reflectivity of the Mach-Zehnder interferometer to match the computed target reflectivity, wherein the controller is configured to compute the target reflectivity based on the derivative of the reflectivity with respect to time, wherein the derivative of the reflectivity with respect to time is a function of the detected signal, wherein said function comprises a negative term.

2. The quantum optical memristor according to claim 1, wherein the function is a linear function of the detected signal.

3. The quantum optical memristor according to claim 2, wherein the negative term is a negative offset proportional to an expected maximum of the signal.

4. The quantum optical memristor according to claim 1, wherein the controller is configured to perform an integration step over the derivative of the reflectivity to obtain the target reflectivity.

5. The quantum optical memristor according to claim 4, wherein the controller is configured to perform a time-window integration step over a time frame of length to obtain the target reflectivity.

6. The quantum optical memristor according to claim 5, wherein the length of the time frame is configurable.

7. The quantum optical memristor according to claim 6, wherein the length of the time frame is configured to be equal to or lower than a modulation period of an optical input signal at an optical input of the Mach-Zehnder interferometer.

8. The quantum optical memristor according to claim 1, wherein the signal the detector relates to a detected number of photons.

9. The quantum optical memristor according to claim 1, wherein a parallel path having an optical input and an optical output is provided, wherein the optical input and the optical output of the parallel path are a second optical input and a second optical output of the quantum optical memristor respectively, wherein the parallel path and the Mach-Zehnder interferometer are configured to be supplied by a same source of photons, wherein state of the photons in the parallel path is substantially unmanipulated by the parallel path.

10. The quantum optical memristor according to claim 9, wherein the parallel path is configured to relate to a first spatial mode and the Mach-Zehnder interferometer is configured to relate to a second spatial mode of a qubit encoded as a single photon in a superposition of the first spatial mode and the second spatial mode.

11. The quantum optical memristor according to claim 1, wherein the Mach-Zehnder interferometer comprises two beam splitters, wherein the beam splitters each have a 50/50 splitting ratio.

12. The quantum optical memristor according to claim 1, wherein the quantum optical memristor is at least partly provided as a part of an integrated photonic chip, wherein at least the Mach-Zehnder interferometer is part of the integrated photonic chip.

13. The quantum optical memristor according to claim 9, wherein the quantum optical memristor is at least partly provided as a part of an integrated photonic chip, wherein at least the Mach-Zehnder interferometer and the parallel path are part of the integrated photonic chip.

14. The quantum optical memristor according to claim 12, wherein the quantum optical memristor is at least partly based on glass and is laser-written in the glass, wherein at least the Mach-Zehnder interferometer is based on glass and laser-written in the glass.

15. The quantum optical memristor according to claim 13, wherein the quantum optical memristor is at least partly based on glass and is laser-written in the glass wherein at least the Mach-Zehnder interferometer and the parallel path are based on glass and laser-written in the glass.

16. The quantum optical memristor according to claim 1, wherein the Mach-Zehnder interferometer comprises two beam splitters, wherein the beam splitters are guided directional couplers.

17. A method of manipulating optical qubits with a quantum optical memristor, wherein the quantum optical memristor comprises:

a Mach-Zehnder interferometer having at least a first optical input and a first optical output and a second optical output, wherein the first optical input and the first optical output of the Mach-Zehnder interferometer are a first optical input and a first optical output of the quantum optical memristor respectively; and a detector configured to detect a time-dependent optical signal at the second optical output of the Mach-Zehnder interferometer; and a controller configured to compute a target reflectivity of the Mach-Zehnder interferometer, wherein the controller is configured to update reflectivity of the Mach-Zehnder interferometer to match the computed target reflectivity, the method including the steps of:

providing the quantum optical memristor with one or more photons at the first optical input of the quantum optical memristor;

measuring an optical signal at the detector; and updating the reflectivity of the Mach-Zehnder interferometer to match the computed target reflectivity;

wherein the target reflectivity is calculated based on a derivative of the reflectivity with respect to time, wherein the reflectivity is a function of the detected signal, wherein said function comprises a negative term.

18. The method of claim 17, wherein the quantum optical memristor comprises a parallel path having an optical input and an optical output, wherein the optical input and the optical output of the parallel path are a second optical input and a second optical output of the quantum optical memristor respectively, wherein the first optical input and the second optical input of the quantum optical memristor are configured to be supplied by a same source of photons, wherein the state of the photons in the parallel path is substantially unmaninpulated, wherein the parallel path is configured to relate to a first spatial mode and the Mach-Zehnder interferometer is configured to relate to a second spatial mode of a qubit encoded as a single photon in a superposition of the first and the second spatial mode; wherein the method includes:

providing the quantum optical memristor with a qubit encoded as a photon in a superposition of the first and the second spatial mode.

* * * * *